(12) United States Patent
Tiso et al.

(10) Patent No.: US 8,442,034 B2
(45) Date of Patent: May 14, 2013

(54) DUAL MODE NETWORK TELEPHONY GATEWAY

(75) Inventors: William J. Tiso, Sparta, NJ (US); Joe R. Gruber, West Chester, OH (US)

(73) Assignee: Intel Corporation, Santa Clara, CA (US)

( * ) Notice: Subject to any disclaimer, the term of this patent is extended or adjusted under 35 U.S.C. 154(b) by 1250 days.

(21) Appl. No.: 11/693,226

(22) Filed: Mar. 29, 2007

(65) Prior Publication Data

US 2008/0240403 A1  Oct. 2, 2008

(51) Int. Cl.
*H04L 12/66* (2006.01)
*H04M 1/56* (2006.01)
*H04M 1/00* (2006.01)

(52) U.S. Cl.
USPC .............. 370/352; 379/142.07; 379/142.05; 379/387.02; 370/355

(58) Field of Classification Search .......... 370/352–356; 379/142.07, 142.15, 387.02
See application file for complete search history.

(56) References Cited

U.S. PATENT DOCUMENTS

| | | | | |
|---|---|---|---|---|
| 6,952,473 | B1* | 10/2005 | Lee | 379/406.01 |
| 2003/0035523 | A1* | 2/2003 | Mansfield | 379/93.07 |
| 2005/0047497 | A1* | 3/2005 | Rubinstain et al. | 375/222 |
| 2006/0153169 | A1* | 7/2006 | Koifman et al. | 370/352 |
| 2006/0160512 | A1* | 7/2006 | Lim et al. | 455/255 |

* cited by examiner

*Primary Examiner* — Asad Nawaz
*Assistant Examiner* — Joel Hamel
(74) *Attorney, Agent, or Firm* — Barnes & Thornburg LLP

(57) ABSTRACT

A system and method for routing and interacting with a dual mode network telephony environment are disclosed. In one embodiment, the system includes an external analog telephony line, a DSL modem, an analog telephony bridge controller, one or more additional analog telephony lines, and a communication center computer. The system routes analog and Voice-over-Internet Protocol calls between the analog telephony lines and the communication center computer. Furthermore, the communication center computer performs operations on calls inbound to the environment and calls outbound from the environment.

6 Claims, 4 Drawing Sheets

DUAL MODE NETWORK TELEPHONY GATEWAY

FIELD OF THE INVENTION

The invention relates to telephony networks. More specifically, the invention relates to routing and interacting with analog telephony and voice over internet protocol phone calls within a local telephony system.

BACKGROUND OF THE INVENTION

Telephones are ubiquitous throughout modern societies. Residential and business buildings all connect to telephone services. The backbone of telephone networks and customer premises wiring is the twisted pair phone line. Although the twisted pair has been utilized for a very long time, new uses are emerging to piggyback better services on top of the standard analog phone data. One of these trends is the digital subscriber line (DSL). DSL allows for very fast data transfer over a twisted pair concurrently with analog phone traffic.

Voice-over-Internet Protocol (VoIP) telephone services have also become popular in recent years. VoIP utilizes network data packets from high speed Internet provider networks, such as DSL, to transfer real time voice data from one network location to another. One issue with VoIP telephone services is that since they utilize computing devices connected to the Internet to transmit the voice data, the sending and receiving devices for the service is generally near a home computer and not necessarily near the standard analog home phone jacks.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a system and method for routing and interacting with a dual mode network telephony environment are described. In the following description, numerous specific details are set forth. In other instances, well-known elements, specifications, and protocols have not been discussed in detail in order to avoid obscuring the present invention.

References to "one embodiment", "an embodiment", "example embodiment", "various embodiments", "some embodiments", "many embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

Figure 1:
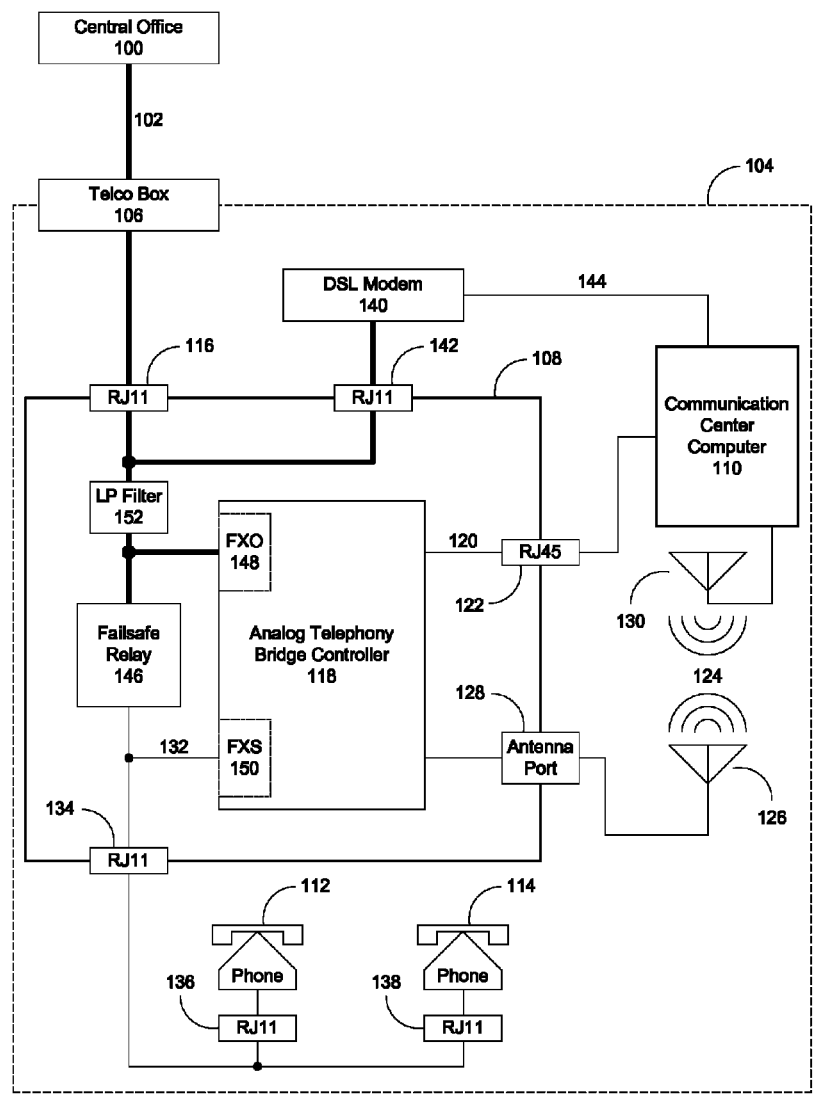
FIG. 1 describes one embodiment of a dual mode telephony system.

FIG. 1 describes one embodiment of a dual mode telephony system. In many embodiments, a central office 100 is connected to a twisted pair external analog telephony wire 102. The central office 100 is a physical building utilized to house a telephone exchange. A telephone exchange is a system of electronic components that connects telephone calls and relays speech information.

Phone calls are transmitted between the central office 100 and a building 104 (the dotted line is representative of the building) using the external analog telephony wire 102. In different embodiments, the building may be a residential house, a retail business, a large office, or any other type of building receiving telephone service. The external analog telephony wire 102 can transmit both standard analog phone information as well as digital subscriber line (DSL) data packets concurrently. Both analog phone calls, using standard analog phone transmissions, and Voice-over-Internet Protocol (VoIP) phone calls, using the DSL data packets, can be transmitted across the external analog telephony wire 102.

There are numerous references in this specification to transmitting a phone call. Although the terminology seems to refer to transmitting a phone call as a singular event, such as transmitting a piece of data, in fact, transmitting a real phone call is an ongoing event from the moment the phone receiver is picked up, until it is put down again. Thus, at any moment of time, the terms "transmit," "transmitting," etc., when referring to "a phone call" or "phone calls" actually refers to transmitting a portion of the phone call. The encapsulated terminology, such as a single phone call, is purely utilized for ease of explanation.

In many embodiments, a dual mode network telephony gateway device 108, a communication center computer 110 (CC computer), and one or more analog phones (phones 112 and 114 in FIG. 1) are located within the building 104. In different embodiments, the CC computer may be a desktop computer, server computer, a dedicated microcontroller, or another device comprised of hardware, software, or a combination of both, used to perform specific functions regarding any received phone calls.

The external analog telephony wire 102 enters the building at a telco box 106. In some embodiments, the telco box 106 is located on the outside of the building at the external analog telephony wire 102 building entry point. The thick line represents all locations in the system where the external analog telephony wire 102, or a continuation of the wire, is located. The external analog telephony wire 102 is then routed from the telco box 106 to the gateway device 108. In some embodiments, RJ11 port 116 (i.e. a standard phone jack plug) is located on the outside of the gateway device 108, which allows the external analog telephony wire 102 to directly connect into the gateway device 108 for further routing.

The gateway device 108 includes an analog telephony bridge controller (ATB controller) 118 in many embodiments. In many embodiments, the ATB controller 118 receives inbound analog phone calls and then transmits them to the CC computer 110, using VoIP protocols. Inbound analog phone calls originate from the central office 100 and are sent to the building 104 over the external analog telephony line 102.

In some embodiments, the ATB controller 118 and the CC computer 110 communicate over a network interconnect 120. In one embodiment, network interconnect wire 120 is an Ethernet cable. In some embodiments, RJ45 port 122 (i.e. a standard Ethernet plug) is located on the outside of the gateway device 108, which a standard Ethernet cable, originating at the CC computer 110, to connect directly to the gateway device 108. In other embodiments, ATB controller 118 and CC computer 110 communicate over a wireless network 124. In one embodiment, antenna 126 connects into gateway device 108 through antenna port 128. Additionally, antenna 130 connects into CC computer 110. Therefore, in this embodiment, ATB controller 118 and CC computer 110 communicate wirelessly over the wireless network 124. In different embodiments, wireless network may be any acceptable standard such as 802.11a, 802.11b, 802.11g, 802.11n, or any other usable wireless protocol.

The ATB controller 118 receives the inbound analog phone call from the external analog telephony wire 102 and converts the analog phone call into one or more network data packets. The network data packets are then sent across either the network interconnect 120 or across the wireless network 124 to the CC computer 110.

The CC computer 110 receives the network data packets and reconstructs the phone call from them. The CC computer 110 then analyzes the phone call. In different embodiments, the analysis may include determining the originator of the phone call utilizing Caller ID, determining the originator of the phone call utilizing voice recognition software, determining the originator's location of the phone call, or many other types of analysis.

The results of the analysis will, in turn, allow the CC computer 110 to make an informed decision on what type of operation to perform on the phone call. In different embodiments, operating on the phone call may include allowing the call to be transmitted to all connected phones within the building, sending the call directly to a voice messaging or voice mail system, blocking the call from being sent to any phone within the building altogether, sending the call to a particular phone in the building using one of a variety of signaling methods, forwarding the call to a remote phone outside of the building, or many other types of operations.

In many embodiments, the decision is made to allow the call to be transmitted to the phones (phone 112 and phone 114) located within the building 104. Thus, CC computer 110 converts the inbound analog phone call into network data packets again and transmits the call to the ATB controller 118 either utilizing the network interconnect 120 or the wireless network 124. ATB controller 118 receives the network data packets, reconstructs the inbound analog phone call, and transmits the inbound analog phone call across analog telephony line 132. Analog telephony line 132 connects the ATB controller 118 to an additional RJ11 port 134 where a continuation of analog telephony line 132 is routed out into the building 104. The analog telephony line 132 eventually reaches phone 112 and phone 114 through RJ11 ports 136 and 138 respectively. In another embodiment, there may be multiple analog telephony lines like line 132 additionally routed from the ATB controller 118 into the building. In this embodiment, each phone in the building would have it's own analog telephony line. This would allow an inbound call to be routed directly to a target phone within the building 104.

A DSL modem 140 is connected to a continuation of external analog telephony line 102 in many embodiments. In many embodiments, the external analog telephony line 102, after it enters the gateway device 108, branches off to an additional RJ11 port 142. In these embodiments, a continuation of the external analog telephony line 102 connects to the RJ11 port 142 and to the DSL modem 140. Thus, the DSL modem 140 receives the DSL data signals being transmitted from the central office 100 over external analog telephony line 102. The DSL modem 140 converts these signals to network data packets and sends them to CC computer 110.

CC computer 110 receives the DSL network data packets and utilizes the data in a number of ways. In many embodiments, an inbound VoIP phone call is transmitted from the central office 100 to the building using the DSL signal. CC computer 110 receives the inbound VoIP phone call from the DSL modem. CC computer 110 then analyzes the inbound VoIP phone call in the same way as the inbound analog phone call was analyzed. Again, different results of the analysis may lead to different operations on the phone call, in different embodiments. In one embodiment, CC computer 110 determines to transmit the inbound VoIP phone call to phones 112 and 114. Thus, in this embodiment, CC computer 110 converts the inbound VoIP phone call to an analog format. Then CC computer 110 converts the VoIP-to-analog-converted call into network data packets and transmits the call to the ATB controller 118 across either the network interconnect 120 or the wireless network 124.

ATB controller 118 receives the network data packets, reconstructs the VoIP-to-analog-converted phone call from the packets, and transmits the call to phones 112 and 114 over analog telephony line 132.

In many embodiments, a person in building 104 wants to place an outbound call to an external target (i.e. call someone using phone 112 or phone 114 where the call is transmitted to central office 100 for further telephone company routing). In some embodiments, the outbound call originates from phone 112 and is transmitted across analog telephony line 132 to ATB controller 118. In different embodiments, the person (or the phone system within building 104) may want the outbound phone call to be sent across external analog telephony line 102 in either analog format or VoIP format. In some embodiments, the ATB controller 118 is aware of the desired format. In different embodiments, a desired user setting on the gateway device 108 may allow the choice of outbound analog or VoIP, a user setting on the CC computer 110 may control the choice, where the CC computer 110 informs the ATB controller 118 when a change is made, or phone 112 or 114 may have additional features that allow this choice to be made by the person placing the call to inform the ATB controller 118 the desired choice.

Thus, in many embodiments, the ATB controller 118 receives the outbound call as well as the outbound call type (e.g. analog or VoIP). If the outbound call type is analog, in one embodiment, the ATB controller 118 allows the call to pass through gateway device 108 and onto external analog telephony line 102 to transmit to the central office 100. If the outbound call type is VoIP, in one embodiment, the ATB controller 118 transmits the outbound call to the CC computer 110 over either network interconnect 120 or wireless network 124. In this embodiment, CC computer 110 converts the outbound analog phone call placed from phone 112 or 114 to a VoIP phone call. The outbound analog-to-VoIP-converted phone call is then transmitted to DSL modem over network interconnect 144. Finally, DSL modem 140 transmits the outbound analog-to-VoIP-converted phone call to the central office 100 across external analog telephony line 102.

In another embodiment, regardless of the phone call type, the ATB controller 118 transmits the outbound call to the CC computer 110 over either network interconnect 120 or wireless network 124 for analysis. In this embodiment, CC computer 110 performs outbound analysis on the phone call similar to the inbound analysis described above. Information such as the target phone number, the target phone location, and other such information may be utilized in the analysis. In different embodiments, CC computer 110 performs one or more of a number of operations on the outbound call. For example, CC computer 110 may block the outbound call from being transmitted to the central office 100 (e.g. such as a parental block of 1-900 numbers), CC computer 110 may search for least expensive long distance carrier and use a 10-10 prefix type number dynamically, CC computer 110 may allow the call to transmit as originally planned, or many other possible outbound operations.

If the call is permitted by CC computer 110 and the outbound phone call type is analog, then CC computer 110 transmits the outbound call back to the ATB controller 118 so the ATB controller 118 can transmit the outbound phone call to the central office 100 across external analog telephony line 102.

In many embodiments, failsafe relay unit 146 is connected to both external analog telephony line 102 and analog telephony line 132. Failsafe relay unit 146 monitors the ATB controller 118 and if the ATB controller 118 is non-responsive (due to power failure, etc.), failsafe relay unit 146 allows calls transmitted from the central office 100 targeting phone 112 or 114 to circumvent the ATB controller 118 and be routed directly to the phones. Additionally, if the ATB controller 118 is non-responsive, failsafe relay unit 146 allows calls transmitted from either phone 112 or 114 to circumvent the ATB controller 118 and be routed directly to the central office 100. In other embodiments, failsafe relay unit 146 also monitors the CC computer 110 as well (direct monitoring lines to CC computer 110 are not shown in this figure), and if the CC computer 110 is non-responsive, the ATB controller 118 is circumvented just as is described above.

In order to maintain compliant with telephone company standards, gateway device 108, and more specifically, the ATB controller 118 must be able to control the dual mode environment by intercepting the telephony signals without breaking protocols. Thus, to the central office 100, the ATB controller 118 must maintain the appearance of a Foreign Exchange Office interface (FXO) 148. The FXO interface is the plug on a phone interface that must maintain the services that a basic phone does to the central office 100. Additionally, to the phones 112 and 114, the ATB controller 118 must maintain the appearance of a Foreign Exchange Subscriber interface (FXS) 150. The FXS interface is the plug on the wall interface that must maintain the services that the telephone company does from a central office 100. With the FXO 148 and FXS 150 interfaces present and operational on the ATB controller 118, the phone system can maintain integrity.

Additionally, in many embodiments, a low pass filter 152 (LP filter) is coupled to the external analog telephony line 102 before the line reaches the failsafe relay unit 146 and the FXO interface 148. The LP filter 152 keeps the DSL carrier signal out of the inbound audio path for all analog phone interfaces (i.e. phones 112 and 114 and the FXO interface 148). The LP filter 152 located within the gateway device 108 eliminates the need to plug in individual filters at the RJ11 phone jacks 136 and 138.

Figure 2:
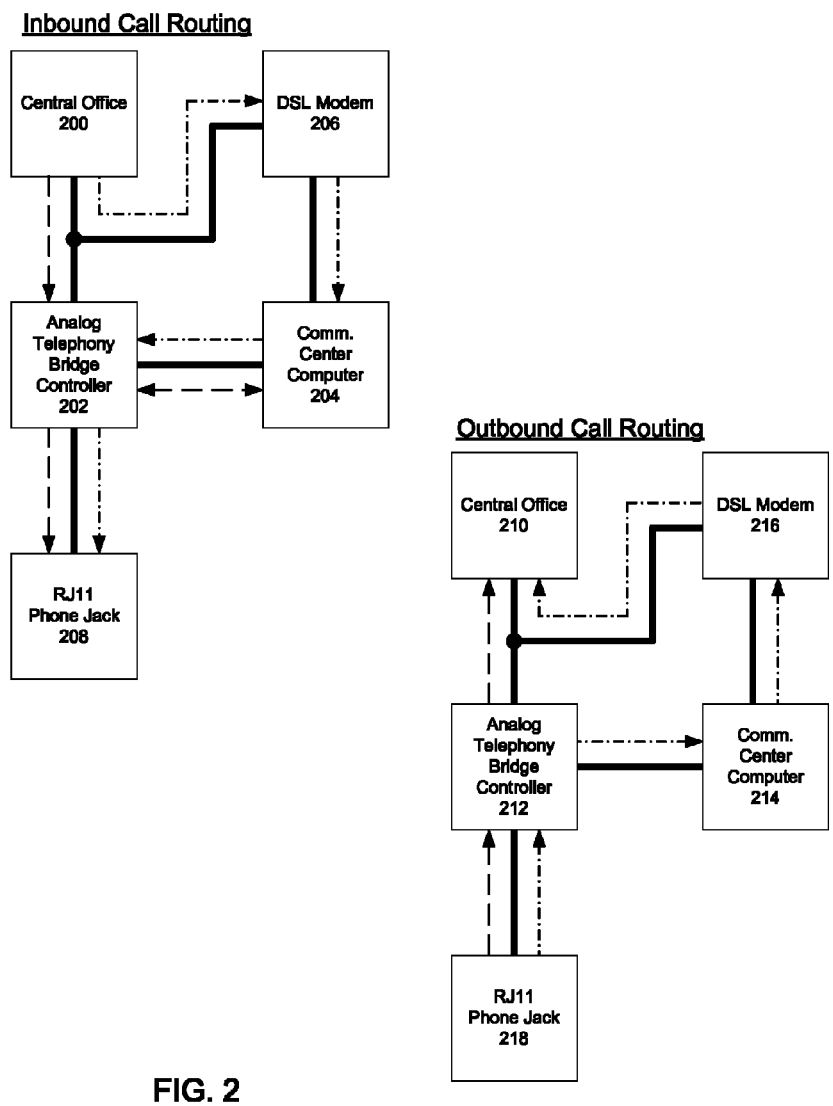
FIG. 2 describes one embodiment of a dual mode telephony system routing inbound and outbound phone calls.

FIG. 2 describes one embodiment of a dual mode telephony system routing inbound and outbound phone calls. Numerous details are set forth in FIG. 1 regarding the specifics of the functional blocks shown in FIG. 2. Inbound analog phone call routes are represented by the dashed lines with arrows and an inbound VoIP phone call routes are represented by the dash-dot lines with arrows. The thick, non-arrow lines represent the interconnections between the functional blocks.

The inbound phone call example routes are illustrated in the upper left portion of FIG. 2. Thus, in one embodiment, the central office 200 transmits an inbound analog phone call to the ATB controller 202, the ATB controller in turn transmits the inbound analog phone call to the CC computer 204, the CC computer 204 then transmits the inbound analog phone call back to the ATB controller 202, and the ATB controller 202 finally transmits the inbound analog phone call to one or more RJ11 phone jacks, and the call has reached its destination.

In another embodiment, the central office 200 transmits an inbound VoIP phone call to the DSL modem 206, the DSL modem 206 then transmits the inbound VoIP phone call to the CC computer 204, the CC computer 204 first converts the inbound VoIP phone call to analog format and then transmits the inbound VoIP-to-analog converted phone call to the ATB controller 202, and finally, the ATB controller 202 transmits the inbound VoIP phone call to one or more RJ11 phone jacks, and the call has reached its destination.

The outbound phone call example routes are illustrated in the lower right portion of FIG. 2. Thus, in one embodiment a phone coupled to the RJ11 phone jack 218 transmits an outbound analog phone call to the ATB controller 212, the ATB controller 212 then transmits the outbound analog phone call directly to the central office 210 and the call has reached its destination.

In another embodiment, a phone coupled to the RJ11 phone jack 218 transmits an initially outbound analog phone call to the ATB controller 212, the ATB controller 212, determines the outbound call type is VoIP, so the ATB controller 212 transmits the outbound analog phone call to the CC computer 214, the CC computer 214 first converts the outbound analog call to a VoIP call, then transmits the analog-to-VoIP-converted call to the DSL modem 216, and finally, the DSL modem 216 transmits the analog-to-VoIP-converted call to the central office 210 and the call has reached its destination.

Figure 3:
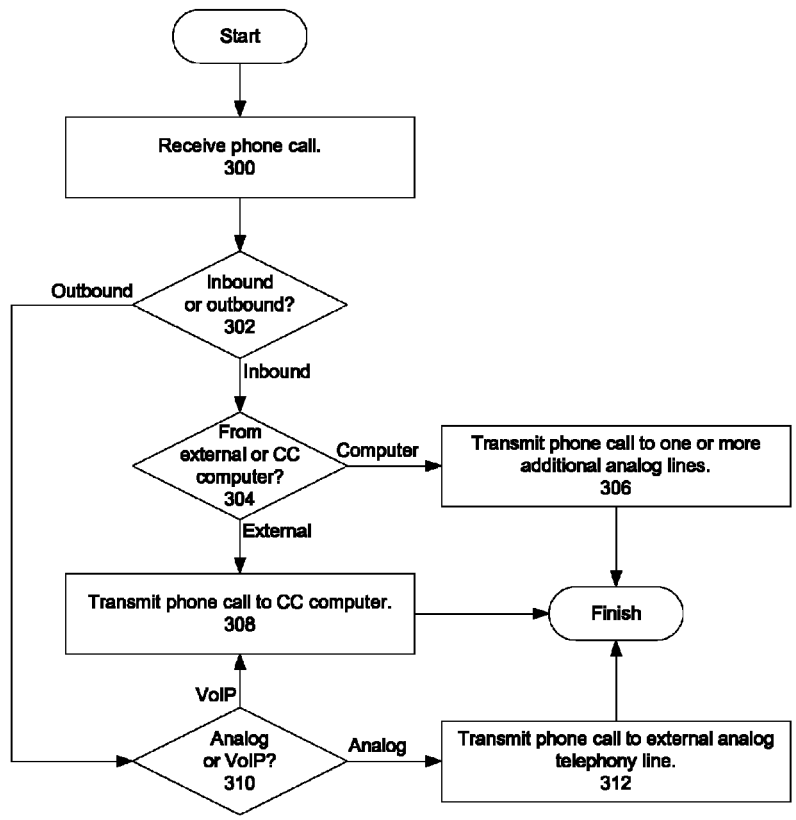
FIG. 3 is a flow diagram of one embodiment of an analog telephony bridge controller process for routing inbound and outbound calls.

FIG. 3 is a flow diagram of one embodiment of an analog telephony bridge controller (ATB controller) process for routing inbound and outbound calls. The process is performed by processing logic that may comprise hardware (circuitry, dedicated logic, etc.), software (such as is run on a general purpose computer system or a dedicated machine), or a combination of both. Referring to FIG. 3, the process begins by processing logic receiving a phone call (processing block 300). Next, processing logic determines if the phone call is inbound or outbound (processing block 302).

If the phone call is inbound, processing logic next determines if the phone call is being transmitted from the external analog telephony line originating at the central office (i.e. an analog phone call), or from the CC computer (i.e. a VoIP phone call) (processing block 304). If the phone call originated from the CC computer, processing logic transmits the phone call to one or more additional analog lines (processing block 306) and the process is finished. If the phone call originated from the external analog telephony line, processing logic transmits the phone call to the CC computer (processing block 308) and the process is finished.

If the phone call is outbound, processing logic determines whether the call type is analog of VoIP (processing block 310). If the phone call type is analog, processing logic transmits the phone call to the external analog telephony line originating at the central office (processing block 312) and the process is finished. Otherwise, if the phone call type is VoIP, processing logic transmits the phone call to the CC computer (processing block 308) and the process is finished.

Figure 4:
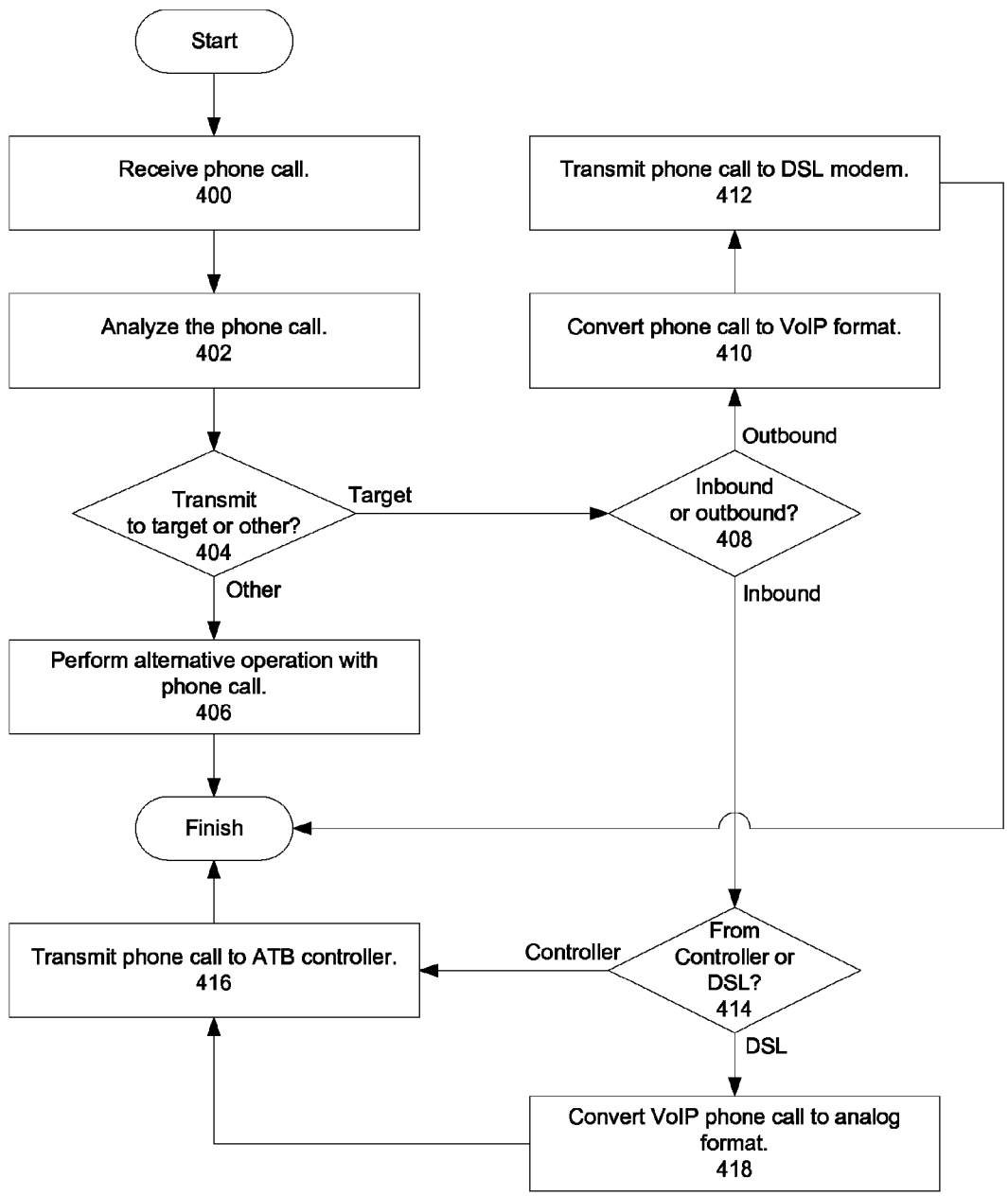
FIG. 4 is a flow diagram of one embodiment of a communication center computer process for routing inbound and outbound calls.

FIG. 4 is a flow diagram of one embodiment of a communication center computer (CC computer) process for routing inbound and outbound calls. The process is performed by processing logic that may comprise hardware (circuitry, dedicated logic, etc.), software (such as is run on a general purpose computer system or a dedicated machine), or a combination of both. Referring to FIG. 4, the process begins by processing logic receiving a phone call (processing block 400).

Next, processing logic analyzes the phone call (processing block 402). The analysis of a phone call is discussed in greater detail in reference to FIG. 1 above. Then processing logic determines if the phone call will be transmitted to the target recipient or if another operation will be performed on the phone call (processing block 404). Again, operations performed on phone calls are discussed in detail in reference to FIG. 1 above. If the target recipient will not receive the phone call (i.e. some other operation is performed), then processing logic performs an alternative operation with the phone call (processing block 406) and the process is finished.

If the target recipient will receive the phone call, then processing logic determines whether the phone call is inbound or outbound (processing block 408). In the embodiments shown in FIG. 4, it is assumed that an outbound analog phone call will get transmitted directly from the phone, through the analog telephony bridge controller (ATB controller), and to the central office, without being transmitted to the CC computer. In other embodiments, all outbound calls are transmitted to the CC computer.

Returning to FIG. 4, if the phone call is determined to be outbound, then processing logic converts the phone call to VoIP format (processing block 410). Next, processing logic transmits the converted VoIP phone call to the DSL modem (processing block 412) and the process is finished. If the phone call is determined to be inbound, then processing logic determines whether the inbound phone call is being transmitted from the DSL modem (i.e. an inbound VoIP phone call) or if the inbound phone call is being transmitted from the ATB controller (i.e. an inbound analog phone call). If the inbound phone call is being transmitted from the ATB controller, processing logic transmits the phone call back to the ATB controller (processing block 416) and the process is finished. Otherwise, if the inbound phone call is being transmitted from the DSL modem, then processing logic converts the VoIP phone call to analog format (processing block 418). Next, processing logic transmits the phone call to the ATB controller (processing block 416) and the process is finished.

Thus, embodiments of a system and method for routing and interacting with a dual mode network telephony environment are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A network telephony gateway device, comprising:
an external analog interface to couple the device to an external analog telephony line;
an internal analog interface to couple the device to an internal analog telephony line;
a digital subscriber line interface to couple the device to a digital subscriber line modem, wherein the device internally couples the external analog interface to the digital subscriber line interface;
a digital network interface to couple the device to a communication center computer, the communication center computer coupled to the digital network interface through a computer network; and
bridge controller logic to:
receive a first phone call in analog format from the external analog telephony line;
perform an analog-to-digital conversion of the first phone call received from the external analog telephony line;
route the digitally converted first phone call to the communication center computer over the network;
receive a digitally reconverted first phone call from the communication center computer over the network, wherein the digitally reconverted first phone call is a digital-to-analog-to-digital conversion of the digitally converted first phone call;
perform a digital-to-analog conversion of the digitally reconverted first phone call received from the communication center computer;
route the digital-to-analog conversion of the digitally reconverted first phone call to the internal analog interface;
receive a second phone call in analog format from the internal analog telephony line;
receive a call type of the second phone call, the call type to indicate whether the second phone call is to be sent across the external analog telephony line in analog format or Voice over Internet Protocol digital format;
determine whether the second phone call is to be sent across the external analog telephony line in analog format or Voice over Internet Protocol digital format as a function of the received call type;
wherein in response to a determination that the second phone call is to be sent across the external analog telephony line in Voice over Internet Protocol digital format:
perform an analog-to-digital conversion of the second phone call received from the internal analog telephony line; and
route the digitally converted second phone call to the communication center computer over the network to be subsequently routed across the external analog telephony line in Voice over Internet Protocol digital format via the digital subscriber line modem; and
wherein in response to a determination that the second phone call is to be sent across the external analog telephony line in analog format, route the second call across the external analog telephony line in analog format.

2. The network telephony gateway device of claim 1, wherein in response to a determination that the second phone call is to be sent across the external analog telephony line in analog format, the bridge controller logic is further operable to:
perform an analog-to-digital conversion of the second phone call received from the internal analog telephony line;
route the digitally converted second phone call to the communication center computer over the network;
receive a digitally reconverted second phone call from the communication center computer over the network, wherein the digitally reconverted second phone call is a digital-to-analog-to-digital conversion of the digitally converted second phone call; and
perform a digital-to-analog conversion of the digitally reconverted second phone call received from the communication center computer; and wherein to route the second call across the external analog telephony line in analog format comprises to route the digital-to-analog conversion of the digitally reconverted second phone call across the external analog telephony line.

3. The network telephony gateway device of claim 1, further comprising:
    filter logic to block an incoming Voice over Internet Protocol digital format phone call from reaching the bridge controller logic directly from the external analog interface.

4. The network telephony gateway device of claim 3, wherein the bridge controller logic is further operable to:
    receive a third phone call in Voice over Internet Protocol digital format from the external analog telephony line;
    route the third phone call to the digital subscriber line modem via the digital subscriber line interface; and
    receive, from the communication center computer, the third phone call routed to the digital subscriber line modem.

5. The network telephony gateway device of claim 4, wherein the bridge controller logic is further operable to:
    perform a digital-to-analog conversion of the third phone call routed to the digital subscriber line modem and received from the communication center computer; and
    route the converted third phone call to the internal analog interface in analog format.

6. The network telephony gateway device of claim 1, further comprising:
    a failsafe relay unit operable to:
        transmit the first phone call from the external analog telephony line directly to the internal analog telephony line if at least one of the communication center computer and the bridge controller logic are non-responsive; and
        isolate the external analog telephony line from the internal analog telephony line if both the communication center computer and the bridge controller are responsive.

* * * * *